US010405556B2

(12) United States Patent
Patel et al.

(10) Patent No.: US 10,405,556 B2
(45) Date of Patent: Sep. 10, 2019

(54) FOOD SERVICE EQUIPMENT FOR MAKING A HOLLOWED-OUT DOUGH PRODUCT FROM BREAD OR OTHER DOUGH PRODUCT FOR SERVING SALADS, SOUPS, HAMBURGERS, SANDWICHES, DESSERTS, AND THE LIKE

(71) Applicants: Bhupendra R. Patel, Carol Stream, IL (US); Jignesh Patel, Bartlett, IL (US); Francisco Vega, Chicago, IL (US)

(72) Inventors: Bhupendra R. Patel, Carol Stream, IL (US); Jignesh Patel, Bartlett, IL (US); Francisco Vega, Chicago, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 213 days.

(21) Appl. No.: 15/585,355

(22) Filed: May 3, 2017

(65) Prior Publication Data

US 2018/0317500 A1 Nov. 8, 2018

(51) Int. Cl.

| | |
|---|---|
| ***A21B 5/02*** | (2006.01) |
| ***A21D 13/32*** | (2017.01) |
| ***A21D 13/33*** | (2017.01) |
| ***A21C 15/00*** | (2006.01) |
| *A21B 3/13* | (2006.01) |

(52) U.S. Cl.

CPC ................ *A21B 5/02* (2013.01); *A21C 15/00* (2013.01); *A21D 13/32* (2017.01); *A21D 13/33* (2017.01); *A21B 3/133* (2013.01)

(58) Field of Classification Search

CPC ........... A21D 13/32; A21D 13/33; A21B 5/02

USPC ........................................... 99/373, 382, 383

See application file for complete search history.

(56) References Cited

U.S. PATENT DOCUMENTS

| | | | | |
|---|---|---|---|---|
| 723,654 A | | 3/1903 | Curtiss | |
| 1,998,764 A | | 4/1935 | Jordan et al. | |
| 3,799,047 A | * | 3/1974 | Freeman | A47J 37/0611 99/332 |
| 4,214,517 A | * | 7/1980 | Caldwell | A21B 5/02 249/122 |

(Continued)

*Primary Examiner* — Kevin F Murphy

(74) *Attorney, Agent, or Firm* — Law Offices of Steven W. Weinrieb

(57) ABSTRACT

Food service equipment for effectively making a hollowed-out dough product from bread or another dough product is disclosed wherein the hollowed-out dough product can then be used in connection with the housing or containment of salads, soups, hamburgers, sandwiches, desserts, or the like. The hollowed-out dough products are formed from bread or other dough products as a result of being placed atop and compressed downwardly upon a pair of platens. Concomitantly with the formation of the bread or dough products into the desired hollowed-out dough products, the interior portions of the hollowed-out dough products are also toasted by means of the platens which are heated internally. Still further, two hollowed-out dough products are formed at the same time such that, for example, they can be utilized in connection with the serving of hamburgers or sandwiches, which require top and bottom hollowed-out dough products, or alternatively, the two hollowed-out dough products can be utilized to serve a diner a pair of open-face sandwiches, or still further, the serving of multiple salads, soups, desserts, or other foods to multiple diners.

17 Claims, 10 Drawing Sheets

(56) References Cited

U.S. PATENT DOCUMENTS

| | | | | |
|---|---|---|---|---|
| 5,299,492 | A * | 4/1994 | Carbon | A21B 5/023 219/524 |
| 5,481,963 | A | 1/1996 | Sesona et al. | |
| 5,636,564 | A | 6/1997 | Weiss | |
| 5,642,659 | A | 7/1997 | Sesona et al. | |
| 5,937,742 | A * | 8/1999 | Steeb | A47J 37/0611 99/375 |
| 5,983,784 | A | 11/1999 | Goldberg | |
| 6,412,400 | B1 * | 7/2002 | Gambino | A47J 37/0611 99/372 |
| 6,467,400 | B2 * | 10/2002 | Raio | A47J 37/0611 100/92 |
| 6,595,114 | B1 | 7/2003 | Endres et al. | |
| 7,638,740 | B1 * | 12/2009 | Hradecky | A47J 37/0611 219/520 |
| 7,827,905 | B2 * | 11/2010 | Bardazzi | A47J 31/368 99/289 R |
| 8,915,179 | B2 * | 12/2014 | Chang | A47J 37/0611 219/386 |
| 2006/0049169 | A1 * | 3/2006 | Li | A47J 37/0611 219/450.1 |
| 2006/0201333 | A1 * | 9/2006 | Friel, Sr. | A47J 37/0611 99/372 |
| 2010/0098825 | A1 | 4/2010 | Veltrop et al. | |
| 2011/0250336 | A1 | 10/2011 | Ewald et al. | |

* cited by examiner

FOOD SERVICE EQUIPMENT FOR MAKING A HOLLOWED-OUT DOUGH PRODUCT FROM BREAD OR OTHER DOUGH PRODUCT FOR SERVING SALADS, SOUPS, HAMBURGERS, SANDWICHES, DESSERTS, AND THE LIKE

FIELD OF THE INVENTION

The present invention relates generally to food service equipment, and more particularly to food service equipment for effectively making a hollowed-out dough product from bread or other dough product wherein the hollowed-out bread product can then be used in connection with the housing or containment of salads, soups, hamburgers, sandwiches, desserts, or the like. The hollowed-out dough products are formed from bread or other dough products as a result of being placed atop and compressed downwardly upon a pair of platens. Concomitantly with the formation of the dough products into the desired hollowed-out dough products, the interior portions of the hollowed-out dough products are also toasted by means of the male platens which are heated internally. Still further, two hollowed-out dough products can be formed at the same time such that, for example, they can be utilized in connection with the serving of hamburgers or sandwiches, which require top and bottom dough products, or alternatively, the two hollowed-out dough products can be utilized to serve a diner a pair of open-face sandwiches, or still further, the serving of multiple salads, soups, desserts, or other foods to multiple diners.

BACKGROUND OF THE INVENTION

In the food industry, it is often desirable to provide or serve diners with unique specialty items, such as, for example, in lieu of serving soup or salad within or upon a conventional soup bowl or salad plate, the soup or salad can be served within a bread bowl or a similarly configured hollowed-out dough product. In addition, particular diners may prefer that the hollowed-out dough products be warmed or even toasted. Similar preferences may also be accommodated as a result some diners preferring to have their hamburgers or other sandwiches served to them in a hollowed-out dough product, again, either warmed and/or toasted. To date, applicants are not aware of any food service equipment that can not only fabricate hollowed-out dough products from bread or other dough products but, in addition, can also toast the interior portion of the hollowed-out dough product in order to in fact accommodate the aforenoted preferences of some diners.

A need therefore exists in the art for new and improved food service equipment which can rectify the aforenoted deficiencies in the art. More particularly, a need exists in the art for food service equipment that can make hollowed-out dough products. A need also exists in the art for food service equipment that can make hollowed-out dough products and can, effectively and simultaneously, toast the interior portions of the hollowed-out dough products. A need further exists in the art for food service equipment that can effectively make hollowed-out dough products from bread or other dough products wherein the hollowed-out dough products can then be used in connection with the housing or containment of salads, soups, hamburgers, sandwiches, desserts, or the like. A further need in the art exists for food service equipment that can effectively make two hollowed-out dough products at the same time. A still further need exists in the art for food service equipment that can effectively make two hollowed-out dough products at the same time such that, for example, the two hollowed-out dough products can then be utilized in connection with the serving of hamburgers or sandwiches, which require top and bottom hollowed-out dough products. A yet further need exists in the art for food service equipment that can effectively make two hollowed-out dough products at the same time such that, for example, the two hollowed-out dough products can then be utilized to serve a diner a pair of open-face sandwiches. A still yet further need exists in the art for food service equipment that can effectively make two hollowed-out dough products at the same time such that the two hollowed-out dough products can then be utilized in connection with the serving of multiple salads, soups, or other foods to multiple diners.

OVERALL OBJECTIVES OF THE INVENTION

An overall objective of the present invention is to provide new and improved food service equipment. Another overall objective of the present invention is to provide new and improved food service equipment which can rectify the aforenoted deficiencies in the art. Still another overall objective of the present invention is to provide food service equipment that can make hollowed-out dough products from bread or other dough products. Yet another overall objective of the present invention is to provide food service equipment that can make hollowed-out dough products from bread or other dough products and can, effectively and simultaneously, toast the interior portions of the hollowed-out dough products. Yet still another objective of the present invention is to provide food service equipment that can effectively make hollowed-out dough products from bread or other dough products wherein the hollowed-out dough products can then be used in connection with the housing or containment of salads, soups, hamburgers, sandwiches, desserts, or the like. A further overall objective of the present invention is to provide food service equipment that can effectively make two hollowed-out dough products at the same time. A still further overall objective of the present invention is to provide food service equipment that can effectively make two hollowed-out dough products at the same time such that, for example, the two hollowed-out dough products can then be utilized in connection with the serving of hamburgers or sandwiches, which require top and bottom hollowed-out dough products. A yet further overall objective of the present invention is to provide food service equipment that can effectively make two hollowed-out dough products at the same time such that, for example, the two hollowed-out dough products can then be utilized to serve a diner a pair of open-face sandwiches. A still yet further overall objective of the present invention is to provide food service equipment that can effectively make two hollowed-out dough products at the same time such that the two buns can then be utilized in connection with the serving of multiple salads, soups, desserts, or other foods to multiple diners.

SUMMARY OF THE INVENTION

The foregoing and other objectives are achieved in accordance with the teachings and principles of the present invention through the provision of new and improved food service equipment which comprises a housing having an upper surface portion upon which the various operative components of the appliance are mounted. More particularly, a pair of platens are fixedly mounted within or upon a heated plate such that the platens project upwardly through the upper surface portion of the housing. The heated plate is electrically connected to a suitable power source and have heating coils disposed therewithin such that when the power source is energized, the heated plate is heated which in turn conducts heat to the platens. An upstanding standard is fixedly mounted upon the upper surface portion of the appliance housing and a compression plate operating lever, having a compression plate pivotally mounted thereon by means of a first pivotal connection, is pivotally mounted upon an upper free end portion of the upstanding standard by means of a second pivotal connection. The undersurface portion of the compression plate is provided with a pair of flat disks such that when the compression plate operating lever is moved downwardly, the compression plate will, in turn, move downwardly and operatively cooperate with the pair of upstanding platens. A connecting linkage is also pivotally connected at a first end portion thereof to the upstanding standard by means of a third pivotal connection located vertically beneath the second pivotal connection defined between the compression plate operating lever and the upstanding standard, while a second end portion of the connecting linkage is pivotally connected to the compression plate by means of a fourth pivotal connection which is likewise located beneath the first pivotal connection defined between the compression plate and the compression plate operating lever. The four pivotal connections in effect define a parallelogram, and accordingly, in this manner, the movement of the compression plate is always defined or confined to move within a vertical plane, regardless of the angular or arcuate position or movement of the compression plate operating lever, such that the compression plate will properly mate with the upstanding platens when the compression plate and platen components are brought into engagement with each other so as to form the desired hollowed-out dough products.

Bread or other dough products, disposed atop each one of the upstanding platens, will accordingly be reshaped and formed into upside-down hollowed-out dough products as a result of their interdisposition between the heated platens and the compression plate disks. Upon locking of the compression plate operating lever at its fully lowered position, the power source is then energized so as to heat the heated plate which, in turn, heats the platens so as to radiate heat, thereby toasting the interior portions of the upside-down hollowed-out dough products. A flipper mechanism, having semi-circular members which effectively cooperate with the platens to form vertically upstanding circumferential wall portions of the hollowed-out dough products, is pivotally mounted upon the upper surface portion of the housing and is operatively cooperative with the upstanding platens such that when the flipper mechanism is pivotally moved from a first, original, or START position disposed atop the upper surface portion of the housing, to a second position which is slightly more than 90° removed from or opposite its first original position, the flipper mechanism will effectively deposit the toasted upside-down hollowed-out dough products onto a hollowed-out dough product discharge tray or landing platform in a right-side up orientation whereby the hollowed-out dough products can then be removed from the tray or landing platform by food preparation personnel who will then use the pair of toasted hollowed-out dough products to serve hamburgers, sandwiches, soups, salads, desserts, or the like, to diners.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 10:
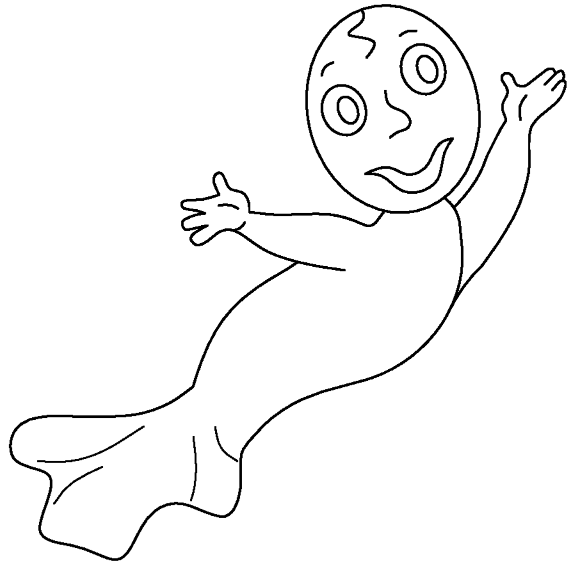
FIG. 10 is an example of a cartoon character or the like which represents an embossment that may be formed upon the platens or comprise the cross-sectional configuration of the platens.
Figure 11:
FIG. 11 is an example of a cultural icon or the like which may represent an embossment that may be formed upon the platens or comprise the cross-sectional configuration of the platens.

Referring now to the drawings, and more particularly to FIGS. 1-5 and FIGS. 7 and 8 thereof, new and improved food service equipment, for the preparation or formation of hollowed-out dough products from bread or other dough products, is disclosed and is generally indicated by the reference character 100. More particularly, it is seen that the new and improved food service equipment 100 comprises a housing 102 which has an upper surface portion 104. Beneath the upper surface portion 104 of the housing 102, there is provided a heated plate 106, which can best be seen in FIGS. 7 and 8, and internally within the heated plate 106, there is embedded a heating coil 108 which is disposed within a sinusoidal arrangement and wherein the opposite ends of the heating coil 108 are respectively provided with a pair of end terminals 110,112 that are adapted to be electrically connected to a source of electrical power, not shown. The heated plate 106 may be fabricated from any suitable material which exhibits good heat conductivity, such as, for example, aluminum, and as can best be appreciated from FIG. 7, the upper surface portion of the heated plate 106 is provided with a pair of circular receptacles 114,116. The receptacles 114,116 are adapted to respectively accommodate a pair of upstanding substantially cylindrical heated platens 118,120 which can best be seen in FIGS. 1-3, wherein the platens 118,120 are adapted to be removably disposed within the receptacles 114,116 either as a result of simply being inserted into the receptacles in a relatively snug manner, threadedly connected to the heated plate 106 as a result of cooperating threads being respectively formed upon external and internal surface portions of the platens 118,120 and the circumferential side walls of the receptacles 114,116, or by other suitable means. It is noted, as can best be seen in FIG. 1, that the platens 118,120 have a diametrical extent of $D_1$, the significance of which will be explained later, and the reason for rendering the platens 118,120 removable from the receptacles 114,116 resides in the fact that sometimes different platens having, for example, different patterns embossed thereon, or where the cross-sectional configuration is desired to be other than that of a circle, are desired to be used. For example, the cross-sectional configuration or embossment may be a star-shaped cross-section, or a square-shaped cross-section, or other geometrical cross-sections, or the cross-section may depict an animal, similar to animal patterns utilized for animal crackers, or still further, the cross-section or embossment may comprise a cartoon character, such as a ghost as shown in FIG. 10, or a cultural icon such as a witch as shown in FIG. 11 for Halloween-themed hollowed-out dough products, or alternatively still further, the cross-sectional configuration or embossment may comprise a company logo. As was the case with the heated plate 106, the platens 118,120 can be fabricated from any suitable material exhibiting good heat conductivity, such as, for example, aluminum. As can also be appreciated, for example, from FIGS. 2 and 3, the platens 118, 120 extend or project upwardly through the upper surface portion 104 of the housing 102.

Figure 6:
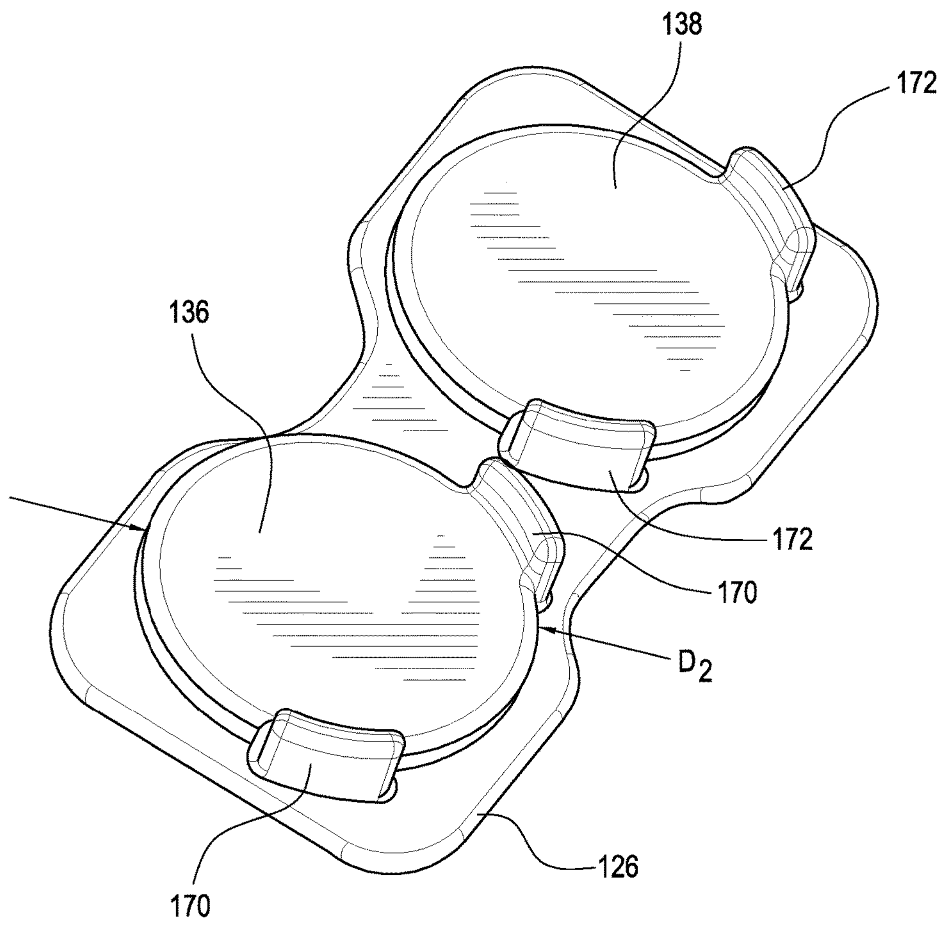
FIG. 6 is an undersurface perspective view of the compression plate as disclosed within FIGS. 1-5.
Figure 7:
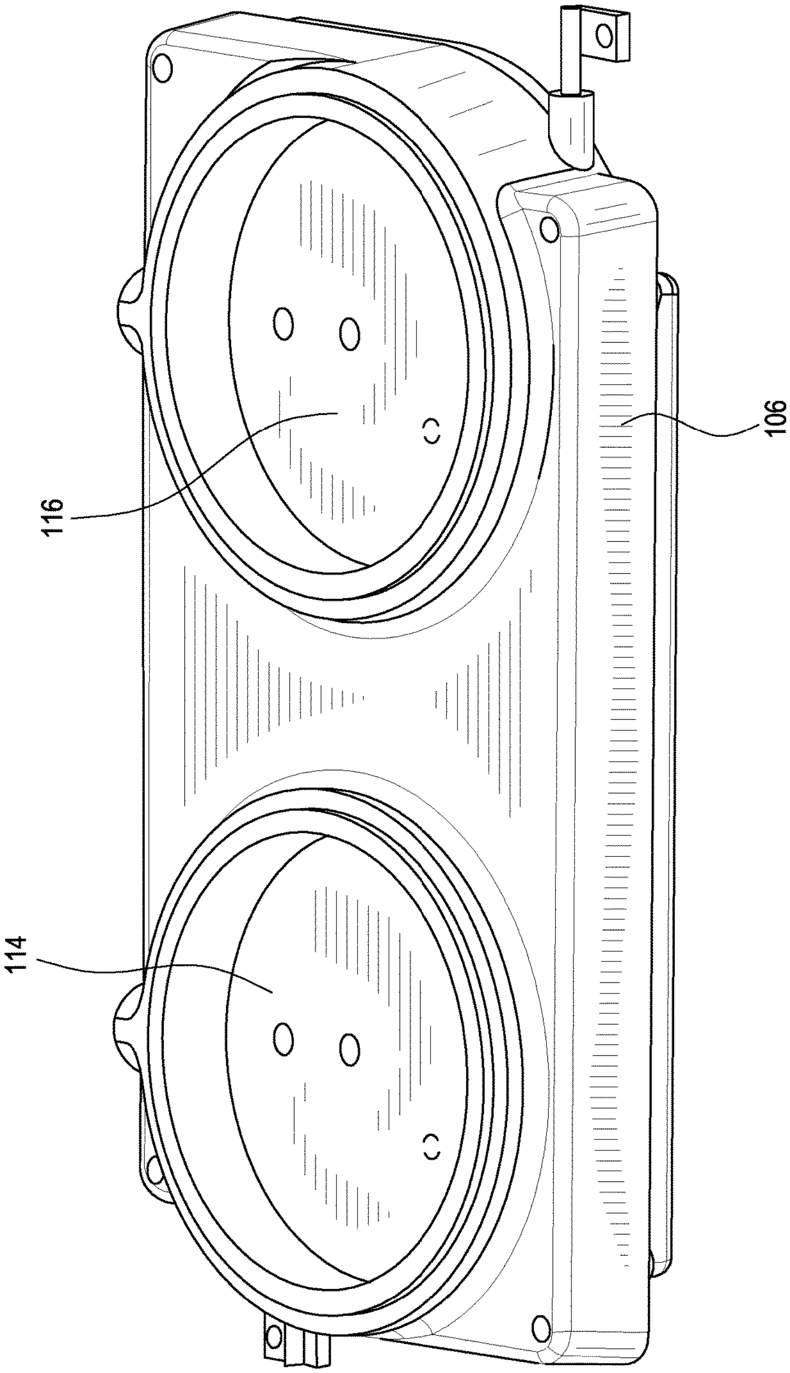
FIG. 7 is a perspective view of the heater plate which is used to heat the heated platens when the heated platens are disposed atop the heater plate.
Figure 8:
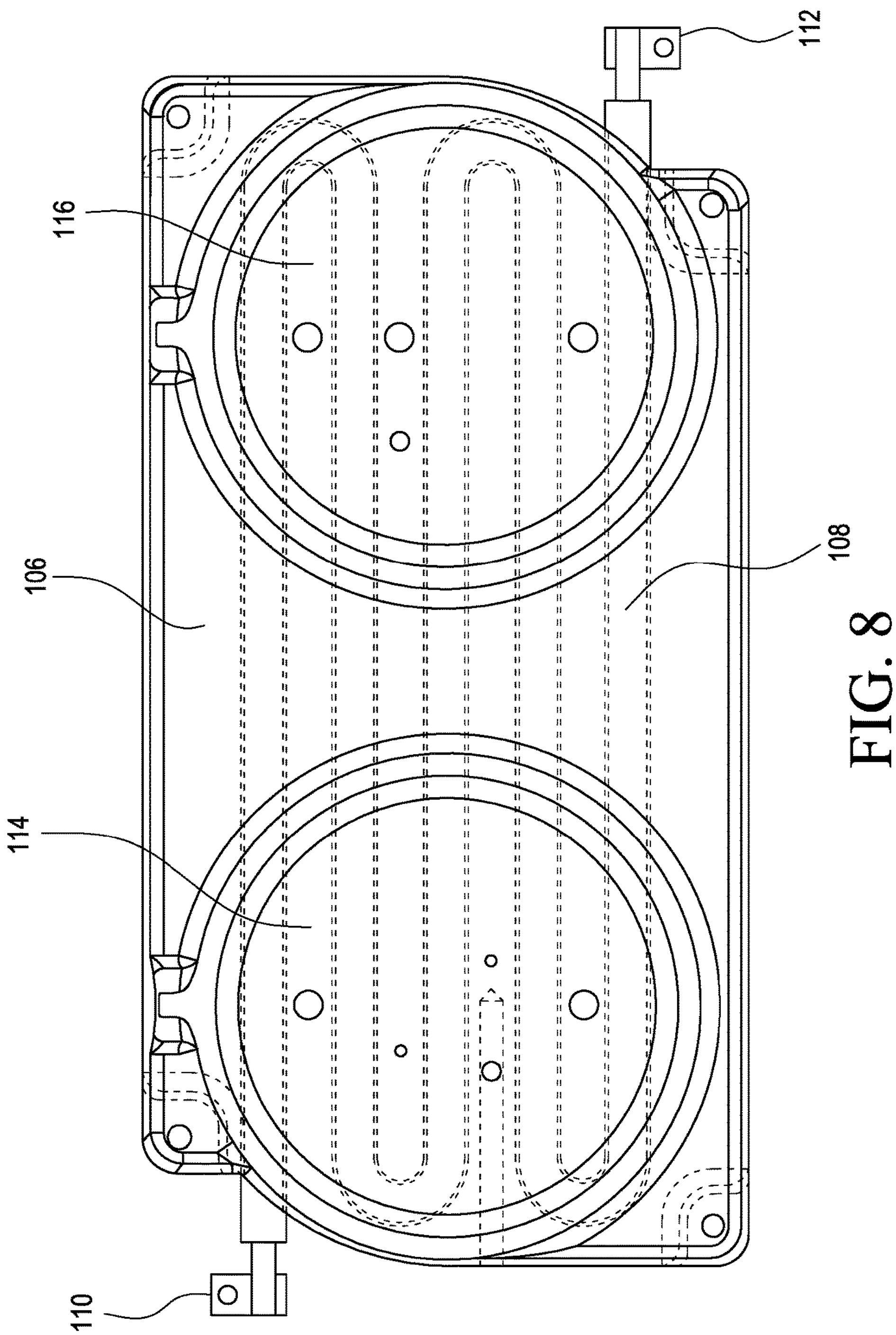
FIG. 8 is a schematic perspective view of the heater plate as disclosed within FIG. 7 showing the internal disposition of the heating coils that will heat the heater plate when the heating coils are energized.
Figure 9:
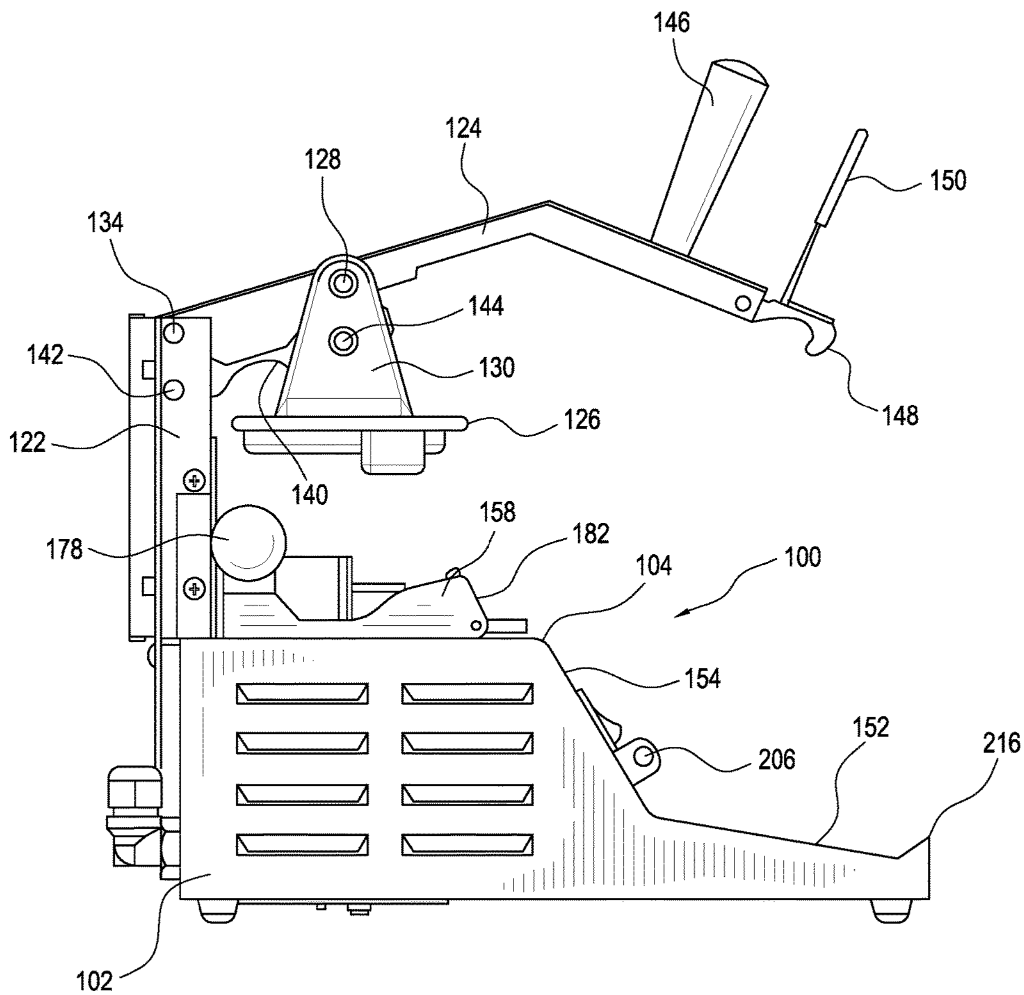
FIG. 9 is a schematic side elevational view of the new and improved food service equipment illustrating the parallelogram linkage system defined between the compression plate operating lever and the compression plate pivotally mounted upon the compression plate operating lever so as to maintain the movement of the compression plate within a vertical plane as the compression plate operating lever is moved through its arcuate trajectory between its fully elevated or START position and its fully lowered and LOCKED position.

Continuing further, and with reference being made to FIG. 9 in addition to FIGS. 1-5, it is also seen that an upstanding standard 122 is fixedly mounted upon the upper surface portion 104 of the appliance housing 102 or, alternatively, the standard 122 can be fixedly secured to the rear wall member, not shown, of the appliance housing 102. A compression plate operating lever 124, having a compression plate 126 pivotally mounted thereon by means of a first pivotal connection 128, as defined by means of a first horizontally oriented pin extending through a pair of laterally spaced upstanding ears or lugs 130,132 which are integrally connected to the compression plate 126, is pivotally mounted upon an upper free end portion of the upstanding standard 122 by means of a second pivotal connection 134. The undersurface portion of the compression plate 126 is provided with a pair of flat disks 136,138, as can best be seen in FIG. 6, such that when the compression plate operating lever 124 is moved downwardly, the compression plate 126 will, in turn, move downwardly whereby the compression plate disks 136,138 will respectively operatively cooperate with the pair of upstanding platens 118,120 so as to form the hollowed-out dough products from the bread or other dough products placed atop the platens 118,120 as will be discussed more fully hereinafter. Each one of the disks 136,138 has a diametrical extent $D_2$ which is greater than the diametrical $D_1$ of the platens 118,120. With reference still being made to FIG. 9 in particular, a connecting linkage 140 is also pivotally connected at a first end portion thereof to the upstanding standard 122 by means of a third pivotal connection 142 which is located vertically beneath the second pivotal connection 134 defined between the compression plate operating lever 124 and the upstanding standard 122, while a second end portion of the connecting linkage 140 is pivotally connected to the pair of laterally spaced upstanding ears or lugs 130, 132 by means of a fourth pivotal connection 144, as defined by means of a second horizontally oriented pin extending through the pair of laterally spaced upstanding ears or lugs 130,132, which is likewise located beneath the first pivotal connection 128 defined between the pair of laterally spaced upstanding ears or lugs 130,132 and the compression plate operating lever 124.

It will be appreciated that the four pivotal connections 128,134,142, 144 effectively define a linkage system that has the configuration of a constantly changing parallelogram when the compression plate operating lever 124 is being moved between its two oppositely disposed positions whereby, accordingly, the movement of the compression plate 126 is always confined to move within a vertical plane regardless of the angular or arcuate position or movement of the compression plate operating lever 124 such that the compression plate 126, and the undersurface disk members 136,138 thereof, will properly mate with the upstanding heated platens 118,120 when the compression plate 126 and the heated platens 118,120 are brought into engagement with each other. It is also noted in connection with the structure of the compression plate operating lever 124 that an upstanding operating handle 146 is mounted upon an upper surface portion of the compression plate operating lever 124 so as to in fact enable personnel to conveniently and easily move the compression plate operating lever 124 between its two oppositely disposed positions. Lastly, a latch mechanism 148 is pivotally mounted upon the free distal end portion of the compression plate operating lever 124 so as to latch the compression plate operating lever 124 at a LOCKED position when the compression plate operating lever 124 is moved to its lowermost position at which time the compression plate 126 and the upstanding heated platens 118,120 are operatively cooperating so as to form the toasted hollowed-out dough products, as will be more fully discussed hereinafter. The latch mechanism 148 is also provided with a handle 150 for manipulating the latch mechanism 148 such that the latch mechanism 148 may be moved from a latched position to an unlatched position as will also be discussed more fully hereinafter.

Continuing further, after the bread or other dough products have been formed or reshaped into the hollowed-out dough products, as will be discussed more fully hereinafter, means are needed to quickly and easily remove the formed hollowed-out dough products from the heated platens 118, 120. Accordingly, a flipper mechanism 151 has been incorporated into the food service equipment 100 so as to easily and effectively remove the formed hollowed-out dough products from the heated platens 118,120 and deposit the formed hollowed-out dough products in a right-side up orientation upon a hollowed-out dough product landing platform or discharge tray 152 which is fixedly secured to the front wall 154 of the equipment housing 102. More particularly, the flipper mechanism 151 comprises a bottom support plate 156 having a pair of through-apertures 155, 157 defined therein, and a pair of side walls 158,160 projecting upwardly from opposite sides or ends of the bottom support plate 156. In addition, a pair of semi-circular die walls 162,164, having a diametrical extent $D_3$ which is greater than the diametrical extent $D_2$ of the disks 136,138 of the compression plate 126, project upwardly from the bottom support plate 156 and are adapted to surround the rear halves of the platens 118,120, as can best be seen in FIG. 1, the platens 118, 120 extending upwardly through the through-apertures 155,157 when the flipper mechanism 151 is disposed at its lowered position, as illustrated in FIG. 1, prior to the formation of the hollowed-out dough products, from the bread or other dough products, when the compression plate 126 is lowered from its fully raised position, as illustrated within FIG. 1, to its fully lowered and locked position as illustrated within FIG. 4.

In this manner, the semi-circular die walls 162,164 are spaced from the upstanding side walls of the platens 118,120 and effectively cooperate with the upstanding side walls of the platens 118,120 so to cause the upstanding side walls of the hollowed-out dough products to be formed once the hollowed-out dough product formation or reshaping and toasting operation has been effected as will be discussed more fully hereinafter. Still further, it is also seen that a pair of tab members 166,168 are fixedly secured to the bottom, support plate 156 at positions located near or adjacent to the front edge portion of the bottom support 156 and are adapted to effectively cooperate with the semi-circular upstanding die walls 162, 164 of the flipper mechanism 151 so as to effectively confine the front portions of the bread or other dough products as they are being formed or reshaped into the heated and toasted hollowed-out dough products. It is also to be appreciated that each one of the flat compression disks 136,138 of the compression plate 126 also has, as can best be seen in FIG. 6, a pair of downwardly dependent arcuately-shaped tabs 170,172 which are adapted to be interposed between the terminal end portions of the semi-circular die walls 162,164 and the tab members 166,168, as considered in a circumferential manner or along a circumferential locus, so as to effectively cooperate with the semi-circular die walls 162,164 and the tab members 166,168 in reshaping and forming the bread or other dough products into the hollowed-out dough products when the compression plate 126 and its undersurface flat disk members 136,138 are fully engaged with the upstanding platens 118,120 as well as being disposed in operative cooperation with the semi-circular die walls 162,164 and the upstanding tab members 166,168. As can best be seen in FIG. 3, a pair of upstanding ears 174,176 are integrally connected to the bottom support plate 156 and effectively form rear portions of the upstanding side walls 158,160, and it is seen that a pair of handles 178,180 are respectively mounted upon the ears 174,176 so as to facilitate the pivotal movement of the flipper mechanism 151 from its original lowered position as illustrated within FIG. 1 to its forwardly pivoted disposition as illustrated within FIG. 3.

Figure 1:
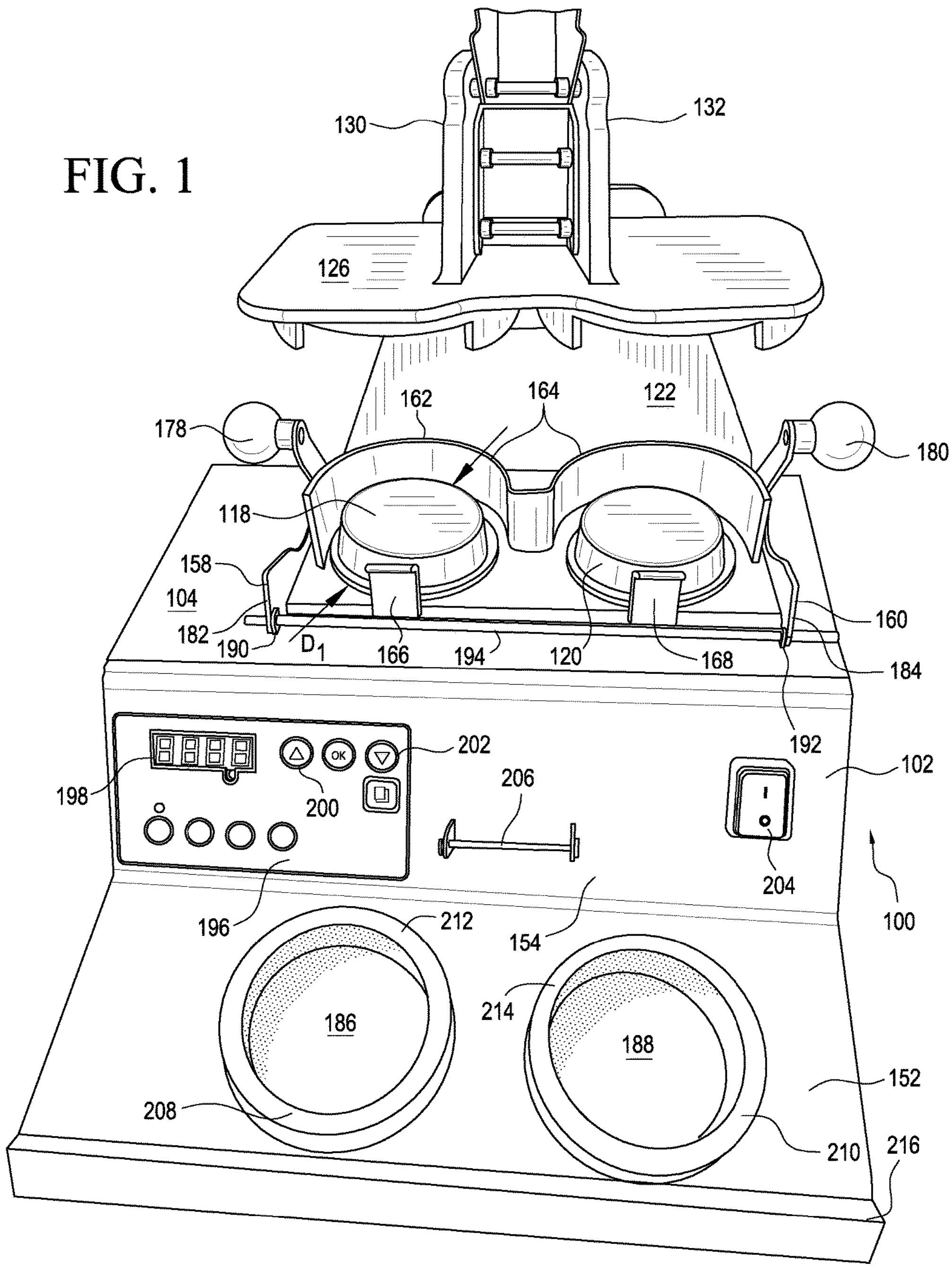
FIG. 1 is a front perspective view of the new and improved food service equipment as constructed in accordance with the principles and teachings of the present invention, and illustrating the operative component parts thereof wherein, more particularly, the compression plate is disposed at its elevated position above the platens, and the flipper mechanism is disposed at its original or START position at which the hollowed-out dough product formative members of the flipper mechanism respectively annularly surround the platens so as to cooperate with the platens in forming the hollowed-out dough products.
Figure 2:
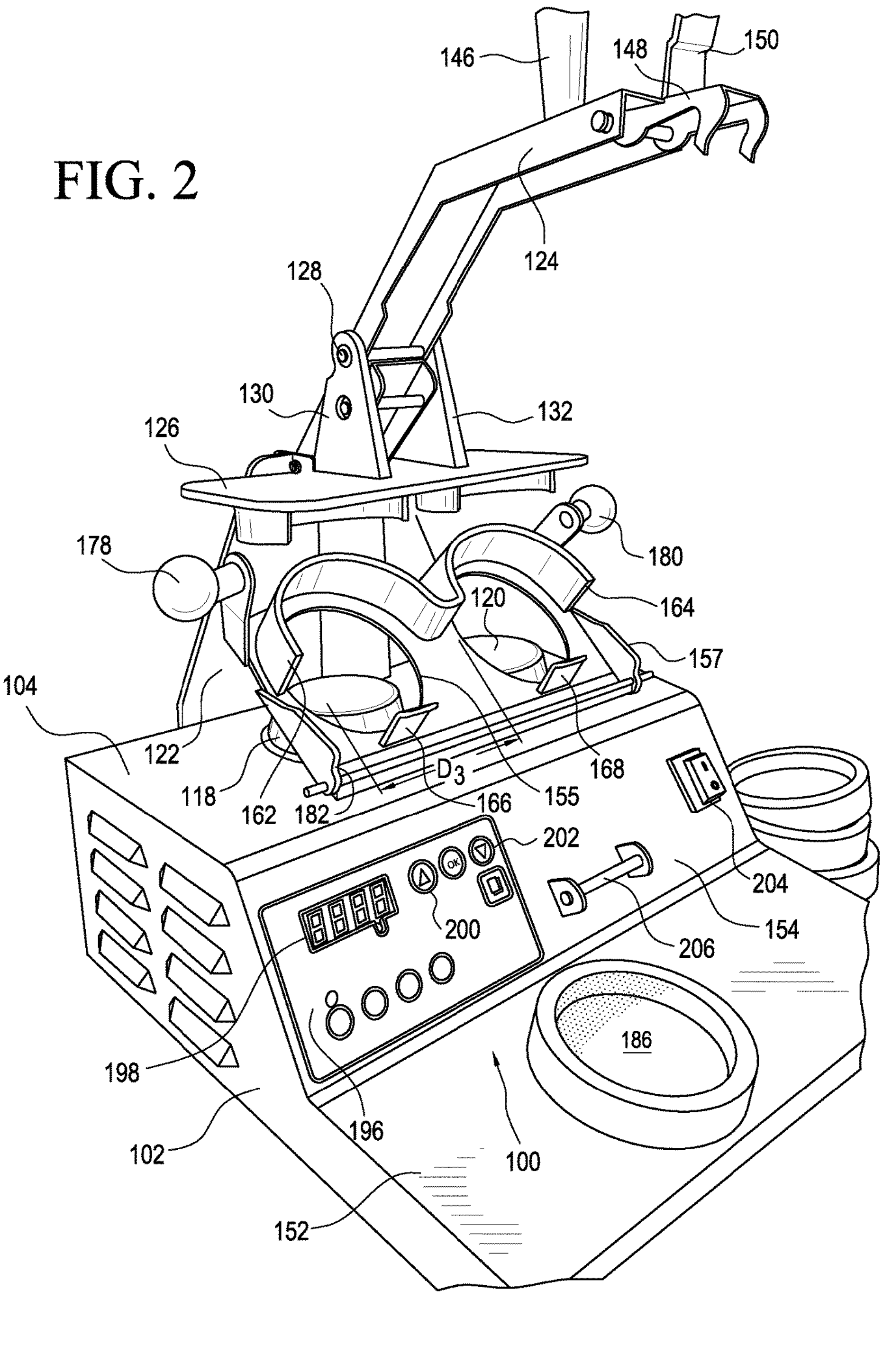
FIG. 2 is a front/left side perspective view of the new and improved food service equipment as illustrated in FIG. 1 wherein the flipper mechanism is disclosed as being pivotally moved from its original or START position to an elevated position so as to initiate the discharge of the pair of hollowed-out dough products which have been formed by the equipment during the hollowed-out dough product formation and toasting cycle.
Figure 3:
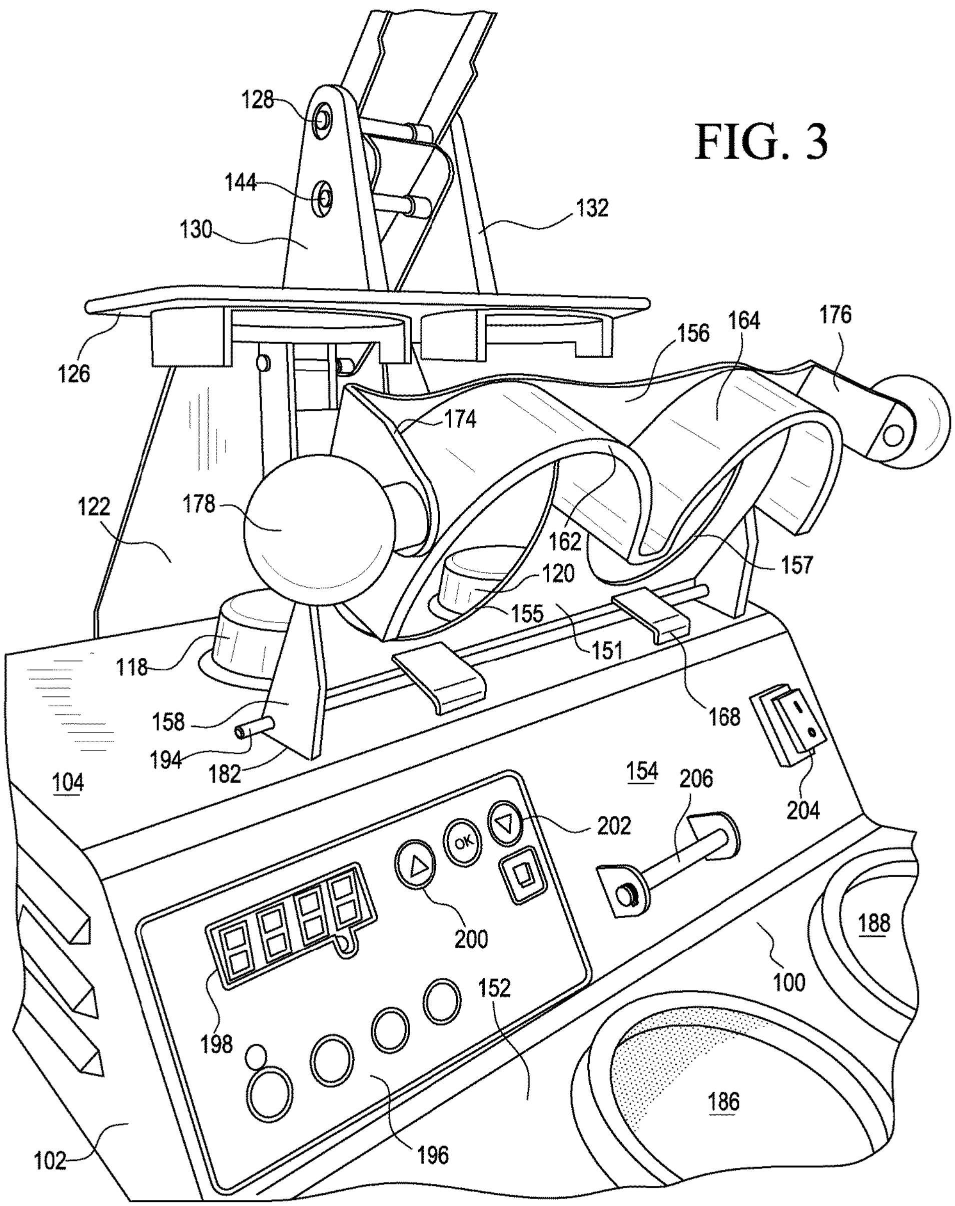
FIG. 3 is a front/left side perspective view similar to that of FIG. 2 showing, however, the flipper mechanism at its final position at which the formed and toasted hollowed-out dough products have been flipped and deposited onto the hollowed-out dough product discharge tray or landing platform.
Figure 4:
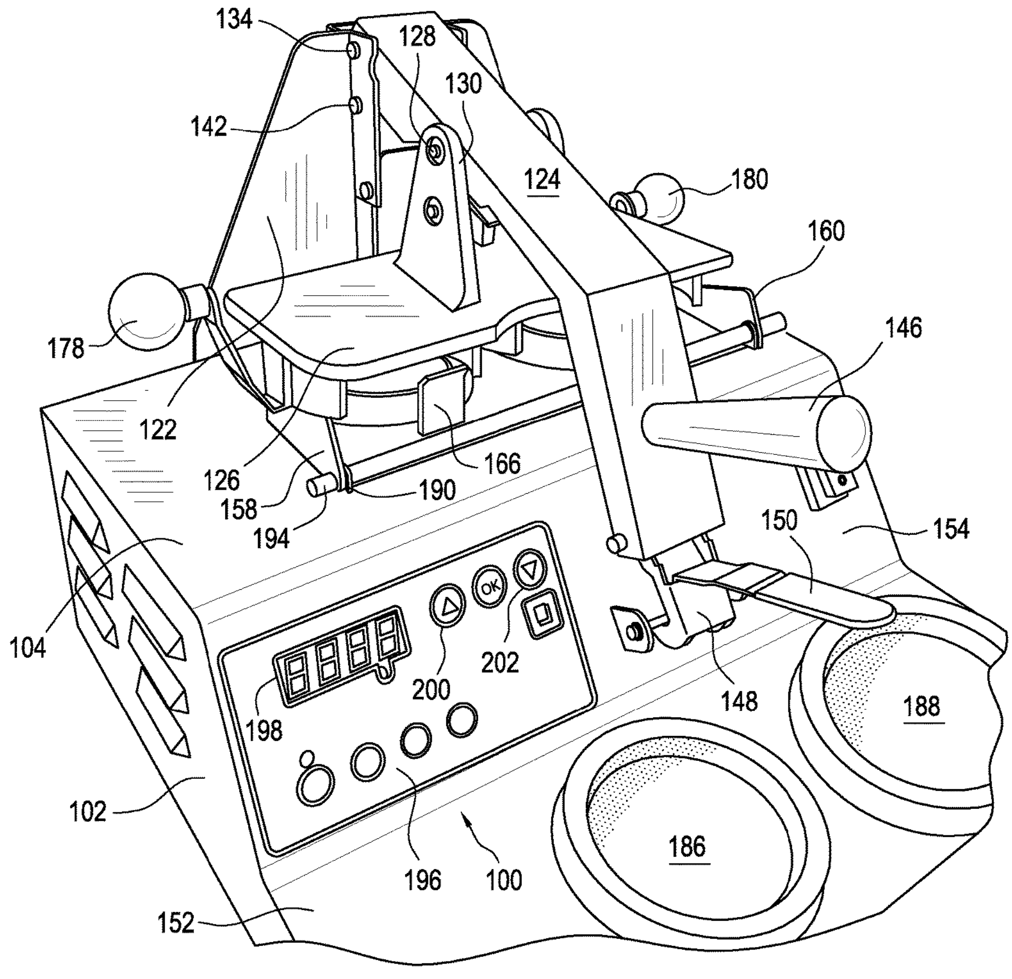
FIG. 4 is a front/left side perspective view similar to that of either FIG. 2 or FIG. 3 showing, however, the disposition of the equipment components when the compression plate operating lever has been moved from its original elevated or START position to its fully lowered and LOCKED position whereby the compression plate, pivotally mounted upon the compression plate operating lever, has likewise been moved to its lowered position at which the compression plate disks are fully engaged with the upstanding platens so as to in fact compress the bread or other dough products therebetween and thereby form or reshape the bread or other dough products into the hollowed-out dough products.
Figure 5:
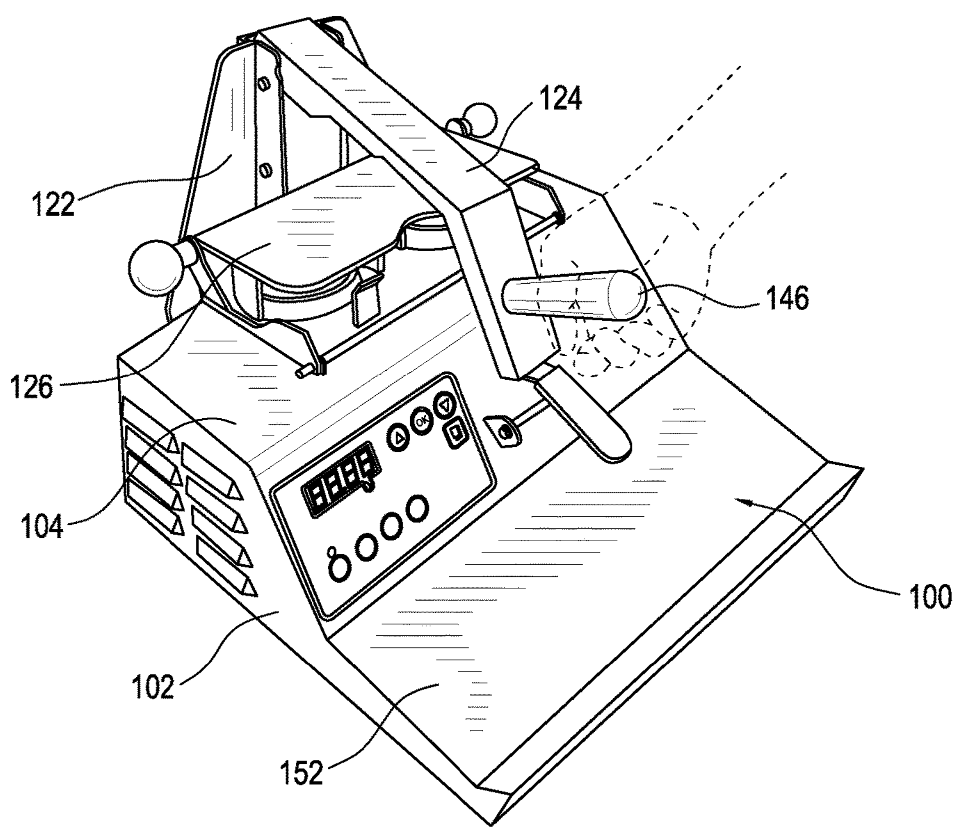
FIG. 5 is a front/left side perspective view similar to that of FIG. 4 showing, however, the unlatching of the compression plate operating lever from its LOCKED state upon the conclusion of a hollowed-out dough product formation and toasting cycle.

Forward, upstanding edge portions 182,184 of the upstanding side walls 158,160 are provided such that when the flipper mechanism 151 is moved toward its forwardly pivoted disposition as illustrated within FIG. 3, at which the flipper mechanism 151 will effectively discharge the toasted hollowed-out dough products 186,188 onto the discharge tray or landing platform 152, the upstanding edge portions 182,184 will engage the upper surface portion 104 of the equipment housing 102 so as to effectively arrest the forward pivotal movement of the flipper mechanism 151 and define its angular disposition of slightly more than 90° from its original position, as illustrated within FIG. 1, so as to readily cause the formed hollowed-out dough products 186,188 to be discharged onto the discharge tray or landing platform 152. It is to be noted that this discharged movement of the formed hollowed-out dough products 186,188 from their disposition within the flipper mechanism 151 and onto the discharge tray or landing platform 152 is effectively facilitated as a result of the absence of front semi-circular portions of the hollowed-out dough-product forming dies, which are formed only by means of the rearwardly disposed semi-circular die walls 162,164. It is lastly noted that in connection with the flipper mechanism 151 and its pivotal movement with respect to the upper surface portion 104 of the equipment housing 102, a pair of upstanding tabs or ears 190,192 are fixedly secured internally within the equipment housing 102 and project upwardly through the upper surface portion 104 of the appliance housing 102 as can best be seen in FIGS. 1 and 4. A horizontally oriented rod 194 extends along the front edge portion of the upper surface portion 104 of the housing 102 and opposite ends of the rod 194 pass through holes or apertures, not shown, that are formed within the pair of upstanding tabs or ears 190,192. In a similar manner, forward portions of the upstanding side walls 158,160 of the flipper mechanism are provided with holes or apertures, also not shown, such that the opposite ends of the rod 194 likewise pass therethrough. In this manner, the flipper member 151 is pivotally mounted upon the rod 194 and is able to be easily and freely moved from its original position as illustrated within FIG. 1 to its discharge position as illustrated within FIG. 3.

Having described substantially all of the operative components of the new and improved food service equipment 100, a brief description of the operation of the equipment 100 will now be provided. When it is desired to effectively form or reshape bread or other dough products into hollowed-out dough products, such as the dough products 186,188 shown in the aforenoted drawing figures, bread or other dough products are disposed atop each one of the upstanding platens 118,120. Subsequently, the compression plate operating lever 124 is moved downwardly from its elevated or raised position as illustrated, for example, within FIGS. 1 and 9, to its lowered position as illustrated, for example, within FIG. 4. As can best be seen in FIG. 1, the front wall 154 of the appliance housing 102 has a user interface control panel 196 disposed thereon, and this user interface control panel 196 can be provided with any suitably desirable controls such as, for example, a clock, timer, or temperature display 198 for displaying the operational time of an operational time cycle during which the hollowed-out dough products 186,188 are to be formed and toasted, as well as for indicating the temperature level to which the heated plate 126 and the heated platens 118,120 will be heated, UP and DOWN arrows 200,202 to control the allotted time and temperature parameters, and the like. In addition, an ON/OFF power switch 204 is also provided so as to permit or prevent electrical power to be conducted to the heated plate 126. Still further, a latching bar 206 is also fixedly secured to a lower central portion of the front wall 154 of the appliance housing 102. In this manner, when the compression plate operating lever 124 is moved downwardly to its lowermost position, the latch mechanism 148 will engage the latching bar 206 so as to in fact lock the compression plate operating lever 124 at its lowermost position.

As a result of this disposition of the compression plate operating lever 124 at its lowermost locked position, the compression plate 126 has accordingly been moved downwardly whereby the flat disks 136,138, formed upon the undersurface portions of the compression plate 126, will operatively engage the upper surface portions of the platens 118,120 upon which the bread or other dough products have been placed. It is to be noted that in light of the fact that the diametrical extent $D_2$ of the flat disks 136,138 of the compression plate 126 is less than the diametrical extent $D_3$ of the upstanding semi-circular die walls 162, 164 of the flipper mechanism 151, the flat disks 136,138 of the compression plate 126 will, at this time, effectively be disposed internally within upper end portions of the upstanding semi-circular die walls 162,164. It will also be recalled that the diametrical extent $D_1$ of the platens 118,120 is less than the diametrical extent $D_3$ of the upstanding semi-circular die walls 162,164, and accordingly, semi-circular or semi-annular spaces, not shown, are effectively formed between the rear portions of the platens 118,120 and the interior wall portions of the upstanding semi-circular die walls 162,164. Therefore, when the bread or other dough products are compressed as a result of the operative engagement of the compression plate disks 136,138 and the upper surface portions of the platens 118,120, the bread or other dough products are effectively extruded into the semi-circular or semi-annular die spaces defined between the rear portions of the platens 118,120 and the interior wall portions of the upstanding semi-circular die walls 162,164 so as to effectively form or reshape the bread or other dough products into the hollowed-out dough products 186,188. It is to be noted that the front portions of the bread or other hollowed-out dough products are likewise formed or reshaped in conjunction with the rear portions of the bread or other dough products as a result of the bread or other dough product effectively encountering both the upstanding tabs 168,168 of the flipper mechanism 151 as well as the downwardly dependent tabs 170,172 of the compression plate 126, although, admittedly, the formation or reshaping of such front portions of the hollowed-out dough products 186,188 is not as precisely or uniformly defined as can be clearly seen, for example, from FIG. 1 wherein first half-sections 208, 210 of the hollowed-out dough products 186,188 can be seen to be thicker and more uniform in their thickness dimensions than the diametrically opposed second half-sections 212,214 of the hollowed-out dough products 186,188. It is to be further noted that for best results, the interior soft bread material of, for example, a hamburger bun, if this is the bread or bread product being utilized, are the surfaces of the half-bun sections of the hamburger bun that are to be disposed atop the platens 118,120.

Continuing further, once the compression plate operating lever 124 has been moved to its fully lowered and locked position, the hollowed-out dough product formation and toasting operation is ready to be commenced. Accordingly, food preparation personnel may then enter predetermined temperature and operational cycle time parameters onto the user interface 196, and the ON/OFF switch 204 may be moved to the ON position such that the power source is energized so as to heat the heated plate 106 which, in turn, heats the platens 118,120 so as to radiate heat which will thereby toast the interior portions of the upside-down hollowed-out dough products 186,188. Upon conclusion of the shaping and toasting cycle, the latch mechanism 148 is unlatched from the latch bar 206, the compression plate operating lever 124 is moved upwardly back to its original or START position, the compression plate 126 is, of course, moved upwardly along with the compression plate operating lever 124 so as to be removed from its disposition within the upstanding semi-circular die walls 162,164 and from its engagement with the heated platens 118,120, and the flipper mechanism 151 may then be pivoted from its original or START position, as shown in FIG. 1, to its pivoted DISCHARGE position as illustrated within FIG. 3, such that the hollowed-out dough products 186,188 are then discharged from the flipper mechanism 151 and deposited onto the discharge tray or landing platform 152 in a right-side up orientation. It is noted that the front edge portion of the discharge tray or landing platform 152 is provided with an upturned lip 216 so as to ensure that the bowl-shaped buns 186,188 are retained upon the discharge tray or landing platform 152 once deposited onto the same by means of the flipper mechanism 151 having been moved to its DISCHARGE position as illustrated within FIG. 3. The hollowed-out dough products 186,188 can then of course be removed from the discharge tray or landing platform 152 by food preparation personnel who will then use the pair of toasted buns to serve hamburgers, sandwiches, soups, salads, desserts, or the like to diners. At this point in time, the food appliance 100 is then ready for a new operational cycle.

Obviously, many variations and modifications of the present invention are possible in light of the above teachings. It is therefore to be understood that within the scope of the appended claims, the present invention may be practiced otherwise than as specifically described herein.

REFERENCE NUMBER KEY

100—Food service equipment
102—Equipment housing
104—Upper surface portion of housing 102
106—Heater plate
108—Heating coil within heating plate 106
110,112—Power terminals for heating coil 108
114,116—Receptacles of heating plate 106
118,120—Heated platens disposed within receptacles 114, 116
122—Upstanding standard
124—Compression plate operating lever
126—Compression plate

128—First pivotal connection defined between the compression plate operating lever 124 and the compression plate 126

130,132—Ears for mounting compression plate 126 upon compression plate operating lever 124

134—Second pivotal connection defined between the compression plate operating lever 124 and the upstanding standard 122

136,138—Compression disks upon undersurface of compression plate 126

140—Linkage member

142—Third pivotal connection defined between the linkage member 140 and the upstanding standard 122

144—Fourth pivotal connection defined between the linkage member 140 and the compression plate 126

146—Operating handle for compression plate operating lever 124

148—Latch mechanism

150—Handle for operating latch mechanism 148

151—Flipper mechanism

152—Discharge tray or landing platform

154—Front face of housing 102

155—Through-aperture within flipper mechanism 151

156—Bottom support plate of flipper mechanism 151

157—Through-aperture within flipper mechanism 151

158,160—Side walls of flipper mechanism

162,164—Upstanding semi-circular walls of flipper mechanism 151

166,168—Upstanding front tabs on flipper mechanism 151

170,172—Downwardly dependent tabs of compression plate 126

174,176—Upstanding ears of flipper mechanism 151

178-180—Handles of flipper mechanism 151

182,184—Front edge portions of side walls 158,160 of flipper mechanism 151

186,188—Formed and toasted hollowed-out dough products

190,192—Upstanding tabs for receiving pivot rod

194—Pivot rod having opposite ends pass through tabs 190,192

196—User interface upon front face 154 of housing 102

198—Timer/temperature display on user interface 154

200—UP button to increase time duration or temperature level

202—DOWN button to decrease time duration or temperature level

204—ON/OFF power switch

206—Latching bar for latch mechanism 148

208,210—Thickened wall portions of formed and toasted hollowed out dough products

212,214—Thin wall portions of formed and toasted hollowed-out dough products

216—Lip upon front edge portion of discharge tray or landing platform

What is claimed as new and desired to be protected by Letters Patent, is:

1. Food service equipment for making a hollowed-out, bowl-shaped dough product from bread or other dough product for use in making, containing, and retaining a food item selected from the group comprising salads, soups, hamburgers, sandwiches, and desserts, comprising:

a housing having a support surface;

a compression plate;

at least one heated platen mounted upon said support surface of said housing and having the configuration of a convex bowl-shaped structure for forming a hollowed-out, concave bowl-shaped dough product, when dough material is deposited thereon and said compression plate is brought into contact with said at least one heated platen having said convex bowl-shaped structural configuration, for accommodating foods internally within the concave bowl-shaped dough product in order to form end food products selected from the group comprising salads, soups, hamburgers, and sandwiches, and desserts;

a compression plate operating lever, operatively connected to said housing and having said compression plate mounted thereon, for moving said compression plate into engagement with said at least one heated platen having said convex bowl-shaped structural configuration, and for moving said compression plate away from said at least one heated platen, having said convex bowl-shaped structural configuration, such that said compression plate is disengaged from said at least one heated platen having said convex bowl-shaped structural configuration; and at least one structural member also mounted upon said support surface of said housing and comprising a semi-annular wall member which is radially spaced from said at least one heated platen so as to effectively form a semi-annular die space between said at least one heated platen and said semi-annular wall member into which dough product is extruded when said compression plate engages said at least one heated platen, whereby when a dough product is disposed upon said at least one heated platen having said convex bowl-shaped structural configuration, and said compression plate is moved into engagement with said at least one heated platen having said convex bowl-shaped structural configuration for forming the concave hollowed-out, bowl-shaped dough product, said compression plate, said structure having said semi-annular wall member, and said at least one heated platen will operatively cooperate together so as to transform the dough product into the concave bowl-shaped dough product for accommodating foods internally within the concave bowl-shaped dough product in order to form end food products selected from the group comprising salads, soups, hamburgers, sandwiches, and desserts, while said at least one heated platen also toasts interior wall portions of the concave bowl-shaped dough product.

2. The equipment as set forth in claim 1, wherein:

said at least one structural member comprising said semi-annular wall member comprises a flipper mechanism pivotally mounted upon said housing and operatively associated with said at least one heated platen for removing the hollowed-out dough product from said at least one heated platen after the hollowed-out dough product has been formed and toasted as a result of being pivotally moved from a first position, at which the hollowed-out dough product is formed upon said at least one heated platen, to a second position at which the hollowed-out dough product is discharged from said at least one heated platen.

3. The equipment as set forth in claim 2, wherein:

said at least one heated platen comprises a pair of heated platens upon which dough products are respectively disposed.

4. The equipment as set forth in claim 3, wherein:

each one of said pair of heated platens has a substantially cylindrical configuration; and said at least one structural member comprising said flipper mechanism comprises a pair of semi-annular wall members which are respectively radially spaced from said pair of heated platens so as to effectively form semi-annular die spaces between said pair of heated platens and said pair of semi-annular wall members into which the dough products are extruded when said compression plate engages said pair of heated platens.

5. The equipment as set forth in claim 2, wherein:

said at least one heated platen has a substantially cylindrical configuration.

6. The equipment as set forth in claim 2, further comprising:

a hollowed-out dough product discharge tray landing platform fixedly connected to said housing for collecting the at least one hollowed-out dough product removed from said at least one heated platen by said flipper mechanism.

7. The equipment as set forth in claim 6, wherein:

an upturned lip is formed upon a front edge portion of said discharge tray landing platform so as to ensure that the at least one hollowed-out dough product remains upon said hollowed-out dough product discharge tray landing platform.

8. The equipment as set forth in claim 1, wherein:

said compression plate is pivotally connected to said compression plate operating lever by means of a first pivotal connection.

9. The equipment as set forth in claim 8, wherein:

an upstanding standard is fixedly mounted upon said housing;

said compression plate operating lever is pivotally connected to said upstanding standard by means of a second pivotal connection; and a connecting linkage is pivotally connected at a first end portion thereof to said upstanding standard by means of a third pivotal connection and is pivotally connected to said compression plate at a second opposite end portion thereof by means of a fourth pivotal connection.

10. The equipment as set forth in claim 9, wherein:

said compression plate operating lever, said connecting linkage, and said first, second, third, and fourth pivotal connections together define a constantly changing linkage system having a configuration which is that of a parallelogram so as to ensure vertical movement of said compression plate within a vertical plane regardless of the angular movement of the compression plate operating lever as said compression plate operating lever moves said compression plate into engagement with said at least one heated platen and moves said compression plate away from said at least one heated platen such that said compression plate is disengaged from said at least one heated platen, thereby ensuring that said compression plate is properly engaged with said at least one heated platen so as to properly form the hollowed-out dough product.

11. The equipment as set forth in claim 1, further comprising:

a latch bar fixedly mounted upon said housing; and a latching mechanism mounted upon said compression plate mounting lever for engaging said latch bar upon said housing such that said compression plate mounting lever can be disposed at a latched position prior to heating of said at least one heated platen.

12. The equipment as set forth in claim 1, further comprising:

a heater plate disposed internally within said housing, said heater plate being operatively connected to said at least one heated platen such that when said heater plate is heated, said heater plate heats said at least one heated platen.

13. The equipment as set forth in claim 12, wherein:

a heating coil is disposed internally within said heater plate and has first and second opposite terminal ends thereof adapted to be connected to an electrical power source such that when said heating coil terminal ends are connected to the power source, said heating coil is energized so as to heat said heater plate which, in turn, heats said at least one heated platen.

14. The equipment as set forth in claim 12, wherein:

said heater plate and said at least one heated platen are fabricated from aluminum.

15. The equipment as set forth in claim 1, further comprising:

a user interface mounted upon a front panel of said housing.

16. The equipment as set forth in claim 15, wherein:

said user interface comprises a plurality of operative buttons and displays for controlling the operation of said appliance, wherein said operative buttons and displays are selected from the group comprising an ON/OFF switch, a timer display, a temperature display, and UP and DOWN buttons for increasing and decreasing the operational cycle time period and the temperature to which said at least one heated platen is heated.

17. The equipment as set forth in claim 1, wherein:

said at least one heated platen has an embossment thereon which is selected from the group comprising a circle, a square, a triangle, a cartoon character, an animal, a logo, and a cultural character.

* * * * *